United States Patent [19]

Teshima et al.

[11] Patent Number: 5,273,288
[45] Date of Patent: Dec. 28, 1993

[54] COMMUNICATION TERMINAL USED AS A GAME MACHINE

[75] Inventors: Tooru Teshima; Hiromu Matsumoto, both of Kawasaki, Japan

[73] Assignee: Fujitsu Limited, Kawasaki, Japan

[21] Appl. No.: 760,773

[22] Filed: Sep. 17, 1991

[30] Foreign Application Priority Data

Sep. 19, 1990 [JP] Japan ................... 2-249377

[51] Int. Cl.⁵ .................... A63F 3/00; A63F 9/24
[52] U.S. Cl. ........................ 273/237; 273/439; 379/96
[58] Field of Search ............. 273/237, 238, 239, 856, 273/439; 379/90, 93, 96, 97

[56] References Cited

U.S. PATENT DOCUMENTS

| 3,654,392 | 4/1972 | Beinhocker et al. | 273/237 |
| 4,372,558 | 2/1983 | Shimamoto et al. | 273/237 |
| 5,023,903 | 6/1991 | Bowen . | |

FOREIGN PATENT DOCUMENTS

| 53-129531 | 11/1978 | Japan . | |
| 0013213 | 1/1979 | Japan | 273/237 |
| 54-16247 | 2/1979 | Japan . | |
| 54-51732 | 4/1979 | Japan . | |
| 0108732 | 8/1979 | Japan | 273/237 |
| 56-102151 | 8/1981 | Japan . | |
| 60-16265 | 4/1985 | Japan . | |
| 60-77785 | 5/1985 | Japan . | |
| 1-195883 | 8/1989 | Japan . | |
| 1488654 | 10/1977 | United Kingdom | 273/237 |
| 2147817 | 5/1985 | United Kingdom | 273/237 |

Primary Examiner—Jessica J. Harrison

[57] ABSTRACT

A communication terminal connected to a telephone line for playing a game with an opponent through a telephone line, includes a display board for displaying the game, a touch panel provided on the display board to detect a coordinate to be displayed, a touch signal detection circuit for generating a position signal corresponding to the coordinate, and a display board drive circuit for displaying the position signal on the display board. A PB signal transmission circuit is provided for transmitting the PB signal indicating the position signal to the telephone line. A PB signal detection circuit receives a PB signal from the opponent and converts that PB signal to a respective position signal.

7 Claims, 11 Drawing Sheets

Fig. 10

| PUSH BUTTON | FREQUENCY (Hz) |
|---|---|
| 1 | 697 , 1209 |
| 2 | 697 , 1366 |
| 3 | 697 , 1477 |
| 4 | 770 , 1209 |
| 5 | 770 , 1366 |
| 6 | 770 , 1477 |
| 7 | 852 , 1209 |
| 8 | 852 , 1366 |
| 9 | 852 , 1477 |
| * | 941 , 1209 |
| 0 | 941 , 1366 |
| # | 941 , 1477 |

COMMUNICATION TERMINAL USED AS A GAME MACHINE

BACKGROUND OF THE INVENTION

1. Field of the Invention

The present invention relates to a communication terminal, particularly, it relates to an electronic game connected to a telephone line for playing a game with an opponent having the same game connected through the telephone line.

2. Description of the Related Art

Recently, a communication system that utilizes a personal computer, has been developed i.e., a communication between personal computers. This communication system is sometimes utilized for playing electronic games, for example, Go, Chess and the like between subscribers. That is, the personal computer is used as a game unit.

However, there are some problems in this type of game equipment using the personal computer as explained hereinafter.

SUMMARY OF THE INVENTION

The object of the present invention is to provide a communication terminal connected to a telephone line for playing a game with an opponent having the same game connected through the telephone line.

In accordance with the present invention, there is provided a communication terminal connected to a telephone line for playing a game with an opponent through the telephone line. The communication terminal includes: a display board for displaying the game; a touch panel provided on the display board to detect a co-ordinate to be displayed; a touch signal detection circuit for generating a position signal corresponding to the co-ordinate; a display board drive circuit for displaying the position signal on the display board; a PB signal transmission circuit for transmitting the PB signal indicating the position signal to the telephone line; and a PB signal detection circuit for receiving the PB signal from the opponent, and for converting the PB signal to the position signal.

In the preferred embodiment, the communication terminal further comprises; a storage unit for temporarily storing the position signal; and a microprocessor for analyzing the position signal and controlling a timing of transmission and reception of the PB signal.

In the preferred embodiment, the position signal has a binary code corresponding to the co-ordinate, and the PB signal transmission circuit and the PB signal detection circuit comprise a table for converting between the PB signal and the position signal.

In the preferred embodiment, the PB signal transmission circuit and the PB signal detection circuit comprise a conversion circuit between the binary code and the decimal code.

In the preferred embodiment, the communication terminal further comprises push button type telephone connected parallel to the communication terminal so that a voice signal of the push button type telephone is simultaneously transmitted to the opponent with the PB signal and the position signal; a receiver for separating the voice signal and the PB signal; and a driver for separating the voice signal and the PB signal.

BRIEF DESCRIPTION OF THE DRAWINGS

In the drawings:

FIG. 10 is a table for explaining conversion between the position signal of a decimal code and the PB signal.

DESCRIPTION OF THE PREFERRED EMBODIMENTS

Before describing the preferred embodiments, an explanation will be given of a conventional art.

Figure 1:
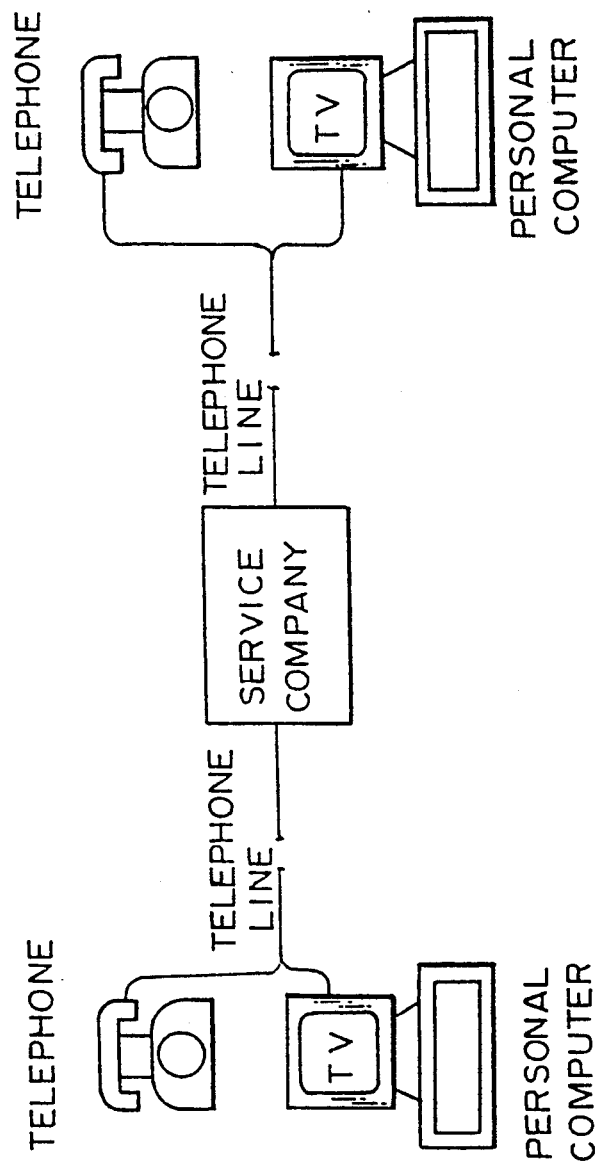
FIG. 1 is a schematic diagram of a communication between personal computers.

FIG. 1 is a schematic diagram of a communication between personal computers. As mentioned above, the personal computer is sometimes used as a game unit. The game equipment (i.e., personal computer) is connected to a telephone line and is capable of playing the game with an opponent having the same game unit by operating a keyboard. Usually, there is provided a service company having a large computer system in communication between personal computers. Of course, the large computer system has a memory. Accordingly, the game is played through the large computer system in the service company.

Figure 2:
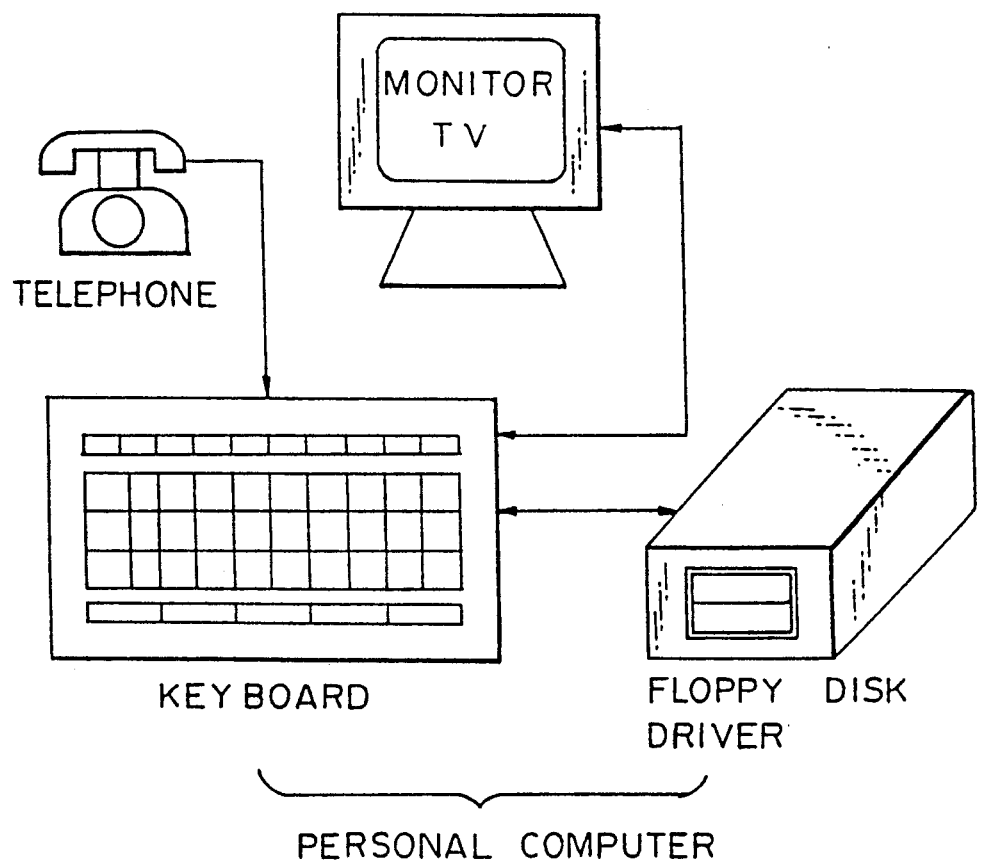
FIG. 2 is a basic structure of a personal computer shown in FIG. 1.

FIG. 2 is a basic structure of the personal computer shown in FIG. 1. The personal computer is basically constituted by a keyboard, a floppy disk driver, and a monitor TV. Further, a telephone is connected to the personal computer. The game is displayed on the monitor TV, and played by operating the keyboard.

There are, however, some problems in the game using a personal computer.

First, it is difficult for unskilled persons to operate the personal computer, for example, small children. Second, since the game is played through the keyboard, it is difficult to simulate an authentic environment. Third, it is impossible to conduct a conversation with the opponent during the game.

Figure 3:
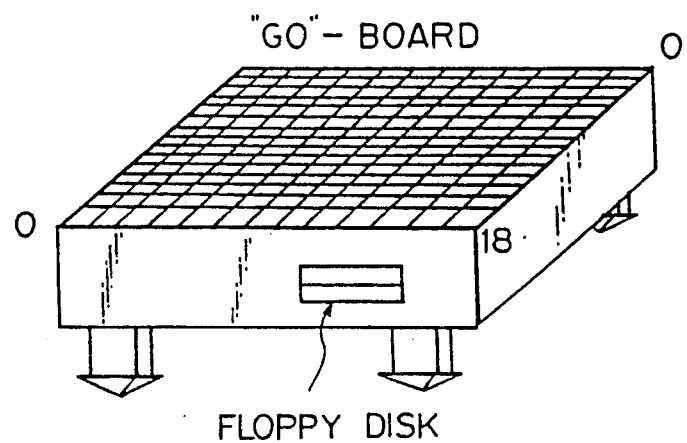
FIG. 3 is a schematic view of a "Go"-board as a game unit.

FIG. 3 is a schematic view of a "Go"-board as game equipment. In FIG. 3, the "Go"-board has nineteen lines 0 to 18 for the X-axis and the Y-axis. The floppy disk is inserted into the board when starting the game. The surface of the Go-board is constituted by an electric panel, i.e., a touch panel. The touch panel is constituted by a plurality of light emission diodes each provided on the intersection of the co-ordinates. Accordingly, the content of the floppy disk can be displayed on the touch panel. When the user touches the intersection of the co-ordinates on the touch panel with a finger, the position is input to the floppy disk.

This type of game unit can create an authentic feeling for the game because the unit does not use the keyboard. However, since this type of unit does not use a personal computer connected to the opponent, it is impossible to play the game with the opponent on real time.

Figure 4:
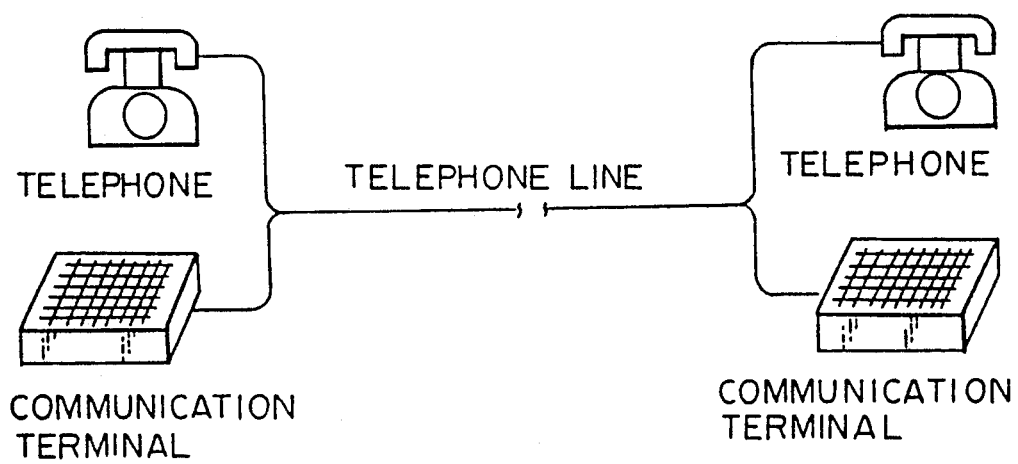
FIG. 4 is a schematic diagram of a communication terminal according to the present invention.

FIG. 4 is a schematic diagram of a communication terminal according to the present invention. The communication terminal is connected to the telephone line and used as, for example, the game equipment. That is, the game unit of the present invention is connected to the opponent having the same equipment through the telephone line. Further, the game unit is connected parallel to a telephone set. Accordingly, it is possible to talk with the opponent during the game using the telephone set, and it is possible to simultaneously send data of the game to the opponent. In this case, the service company is not provided on the telephone line.

Figure 5:
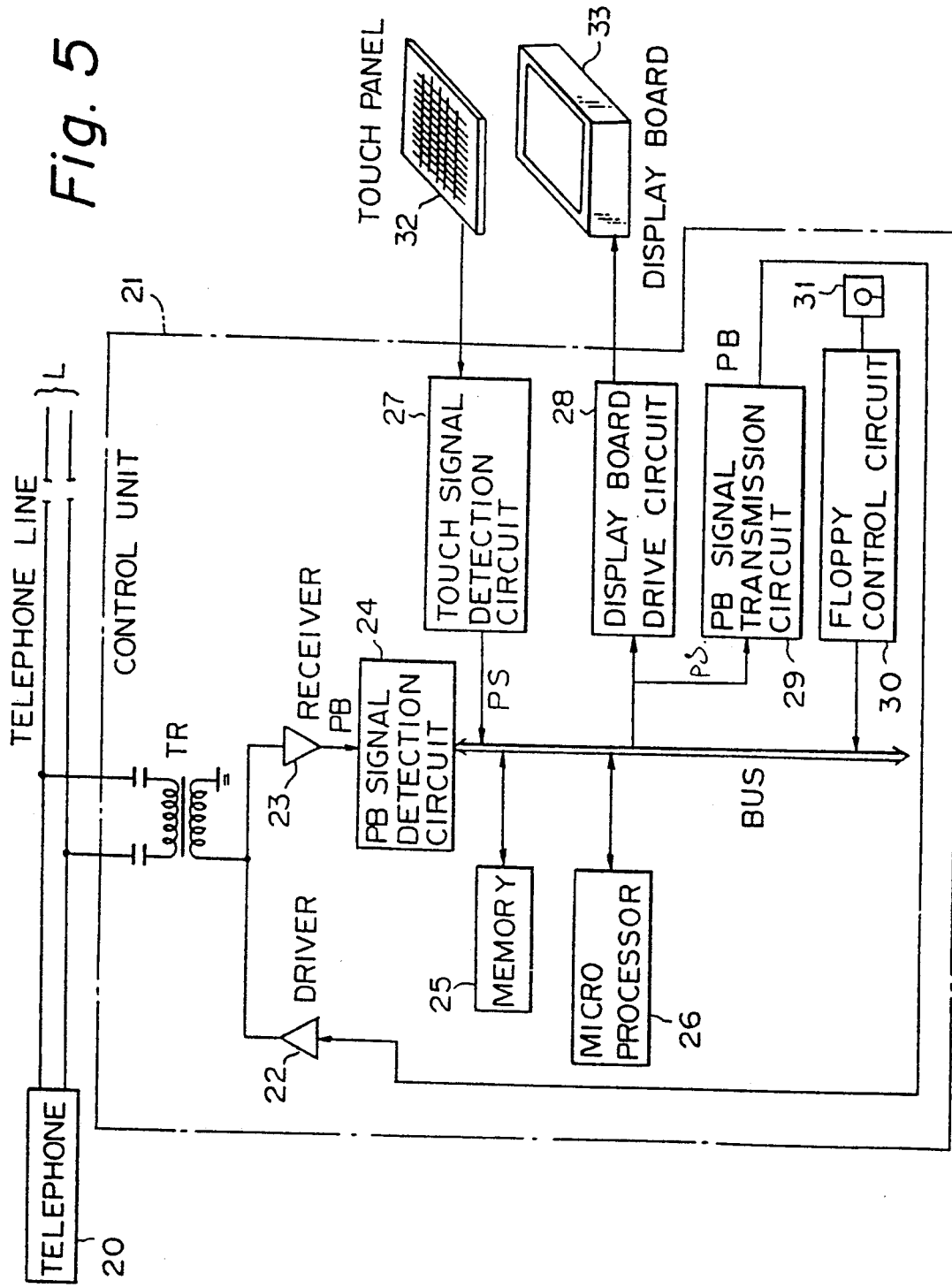
FIG. 5 is a detail block diagram of a communication terminal according to an embodiment of the present invention.

FIG. 5 is a detail block diagram of a communication terminal according to an embodiment of the present invention. This communication terminal is used as the game unit. In FIG. 5, 20 denotes a push button type telephone set connected to the telephone line L, 21 denotes control unit connected parallel with the telephone set 20 to the telephone line L. TR denotes a transformer coupling between the control unit 21 and the telephone line L. Further, 22 denotes a driver, 23 a receiver, 24 a PB (push button) signal detection circuit, 25 a memory, 26 a microprocessor, 27 a touch-signal detection circuit, 28 a display board drive circuit, 29 a PB signal transmission circuit, 30 a floppy control circuit, 31 a floppy disk, 32 a touch panel, and 33 a display board.

The touch panel 32 is constituted by a plurality of piezoelectric elements, and the display board 33 is constituted by a liquid crystal board having a backlight device. When the user touches the intersection of the co-ordinates on the touch panel 32, the touch panel generates the touch signal therefrom. The touch signal is converted to the position signal expressed by the X-axis and the Y-axis binary codes.

Further, usually, a 300 to 3400 Hz frequency is assigned as the frequency band in the telephone line. In this frequency band, a frequency below 1600 Hz is used as the PB signal, and a frequency over 1600 Hz is used as the voice signal. Accordingly, it is possible to separate the PB signal from the voice signal by using a separation means for separating the voice signal from the PB signal. The separation means is provided in the driver 22 and the receiver 23.

The operation of the communication terminal is briefly explained below. First, the user telephones the opponent to inform the opponent of the start of the game through the game unit. Next, the floppy disk 31 storing a game program is inserted into the floppy control circuit 30 so that the game program is loaded in the memory 25. When the user touches the intersection of the co-ordinate on the touch panel 32, the touch panel 32 generates a touch signal to the touch signal detection circuit 27, which detects the co-ordinate touched by the user, and generates the position signal PS.

The position signal PS is input to the memory 25 and the microprocessor 26, and input to the display board drive circuit 28 to display the position on the display board 33. Further, the position signal PS is input to the PB signal transmission circuit 29 that includes a conversion table for converting the position signal PS to the PB signal.

After conversion to the PB signals, the PB signals are transferred to the game unit of the opponent through the driver 22, transformer TR, and telephone line L.

The position signal from the opponent is input to the PB signal detection circuit 24 through the telephone line L, the transformer TR and the receiver 23. The PB signal detection circuit 24 also includes the conversion table for converting the PB signal PS to the position signal. As explained above, the position signal is input to the display board drive circuit 28 and displayed on the display board 33.

Figure 6:
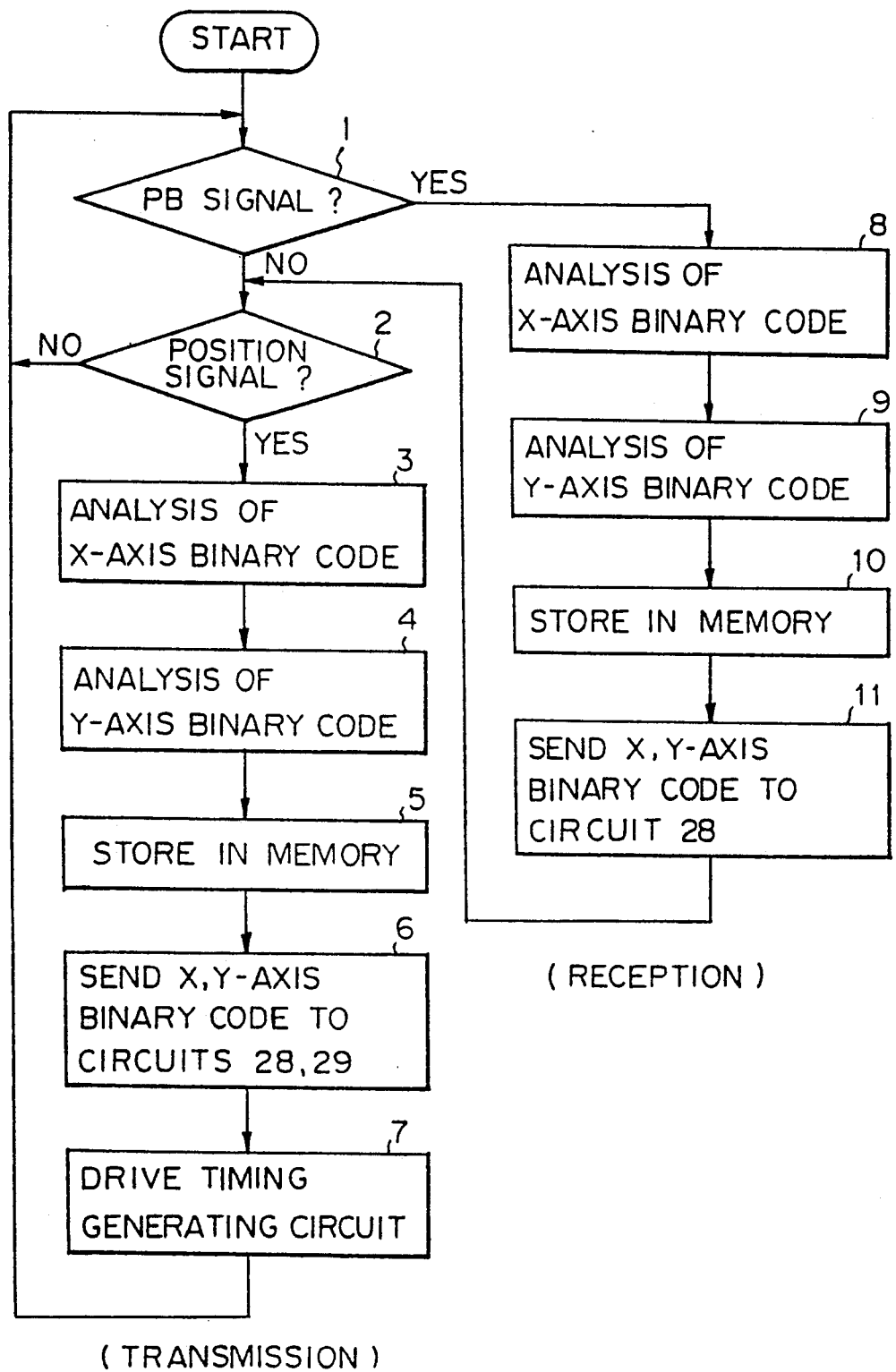
FIG. 6 is a flowchart in a microprocessor shown in FIG. 5.

FIG. 6 is a flowchart in the microprocessor shown in FIG. 5. In FIG. 6, steps 2 to 7 denote the transmission of the PB signal, and steps 8 to 11 denote the reception of the PB signal. First, the microprocessor 26 detects the PB signal (step 1). When the PB signal is not received (NO), the microprocessor 26 detects the position signal from the touch signal detection circuit 27 (step 2). When the position signal is detected (YES), the microprocessor 26 analyzes the X-axis binary code and the Y-axis binary code of the position signal (steps 3 and 4). The result of the analysis is stored in the memory 25 (step 5). Next, the above X-axis binary code and the Y-axis binary code are input to the display board drive circuit 28 and the PB signal transmission circuit 29 (step 6)

The X-axis binary code and the Y-axis binary code are displayed on the display board 33 through the display board drive circuit 28. Further, the X-axis binary code and the Y-axis binary code are converted to the decimal code and further converted to the PB signal in the PB signal transmission circuit 29. The PB signal transmission circuit 29 sends the PB signal to the driver 22.

In the step 1, the PB signal is received (YES), the microprocessor 26 analyzes the X-axis binary code and the Y-axis binary code of the position signal (steps 8 and 9). The result of the analysis is stored in the memory 25 (step 10). Next, the above X-axis binary code and the Y-axis binary code are input to the display board drive circuit 28. The X-axis binary code and the Y-axis binary code are displayed on the display board 33 through the display board drive circuit 28.

Figure 7:
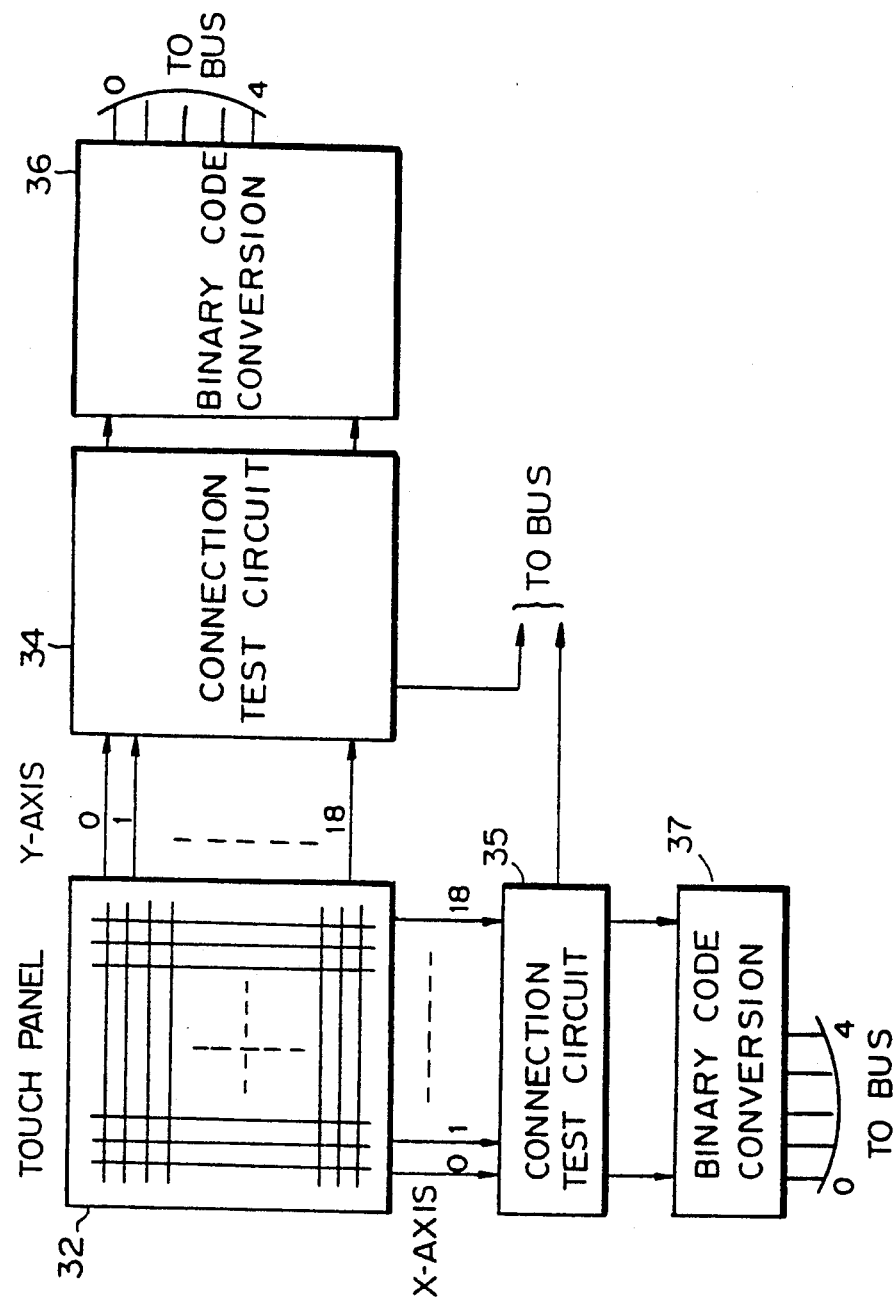
FIG. 7 is a schematic block diagram of a touch signal detection circuit.

FIG. 7 is a schematic block diagram of the touch signal detection circuit. In FIG. 7, 34 and 35 denote connection test circuits for detecting the output of the touch panel 32. 36 and 37 denote conversion circuits for converting the co-ordinate to the binary codes. The outputs of the X-axis and the Y-axis of the touch panel 32 are converted to the binary code indicating the position signal PS. The position signal PS is output to the bus.

Figure 8:
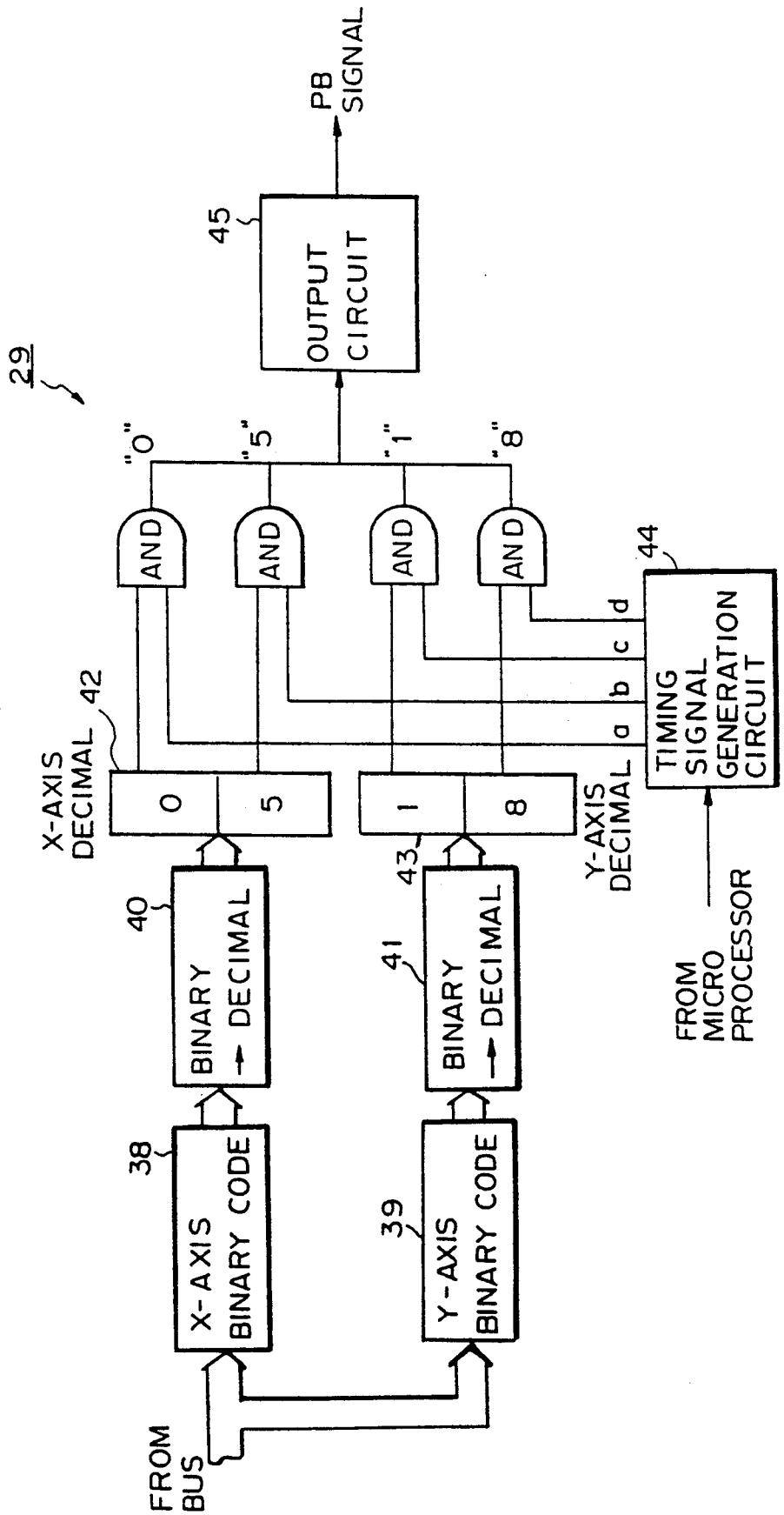
FIG. 8 is a schematic block diagram of a PB signal transmission circuit.

FIG. 8 is a schematic block diagram of the PB signal transmission circuit. In FIG. 8, 38 to 43 denote registers, 44 denotes a timing signal generating circuit for generating timing signals to open the AND gates, and 45 denotes an output circuit for generating the PB signal. The X-axis binary code and the Y-axis binary code are stored in the registers 38 and 39. Then, the X-axis binary code and the Y-axis binary code are converted to the decimal code in the converters 40 and 41.

Figure 9:
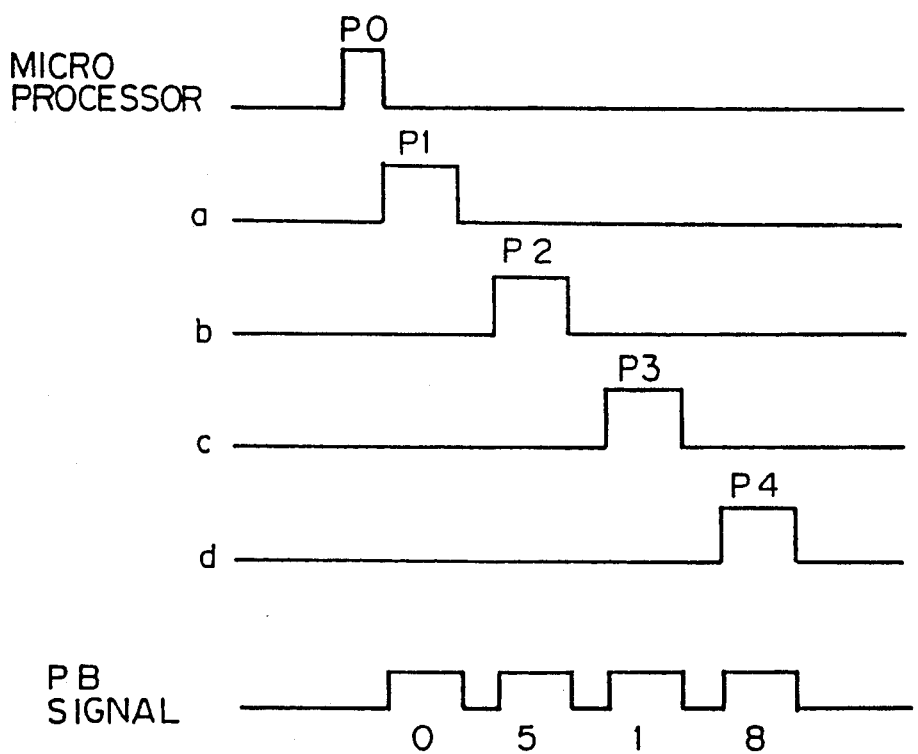
FIG. 9 is a timing chart of the PB signal in the circuit shown in FIG. 8.

FIG. 9 is a timing chart of the PB signal in the circuit shown in FIG. 8. When the microprocessor 26 outputs the start pulse P0 to the timing signal generation circuit 44, the timing signal generation circuit 44 sequentially sends the timing signals P1 to P4 to the corresponding AND gate. Accordingly, for example, the decimal "0" "5" "1" and "8" are output to the output circuit 45. In the output circuit 45, the above decimal are converted to the frequency signals as explained below.

FIG. 10 is a table for explaining the conversion between the position signal of the decimal code and the PB signal. This conversion table is provided in the PB signal detection circuit 24 and the PB signal transmission circuit 29. As is obvious from the table, all frequencies correspond to the Standard of the PB signals.

Figure 11:
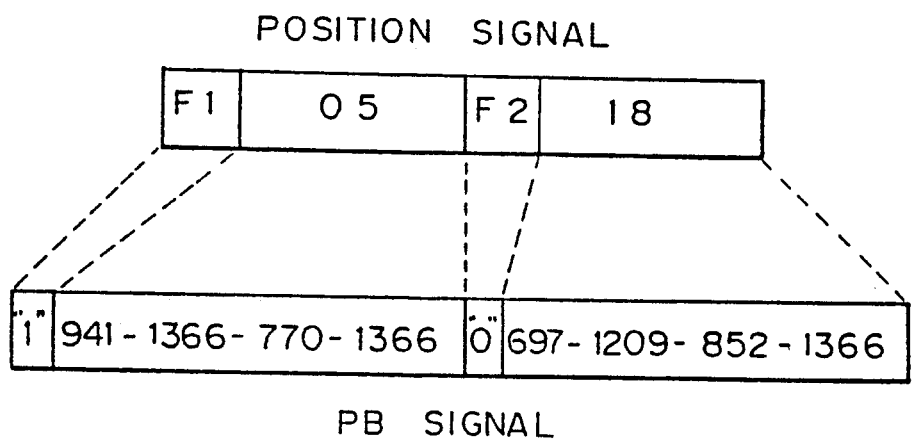
FIG. 11 is a view for explaining conversion between the position signal of the decimal and the PB signal according to an embodiment of the present invention.

FIG. 11 is a view for explaining conversion between the position signal of the decimal and the PB signal according to an embodiment of the present invention. In FIG. 11, F1 denotes a flag indicating the X-axis of the touch panel 32, and F2 denotes a flag indicating the Y-axis of the touch panel 32. For example, the bit "1" is used as the flag of the F1 and the bit "0" is used as flag of the F2. As is obvious from the table shown in FIG. 10, for example, the co-ordinate "05" of the X-axis corresponds to the PB signal "941-1366-770-1366", and the co-ordinate "18" of the Y-axis corresponds to the PB signal "697-1209-852-1366".

Accordingly, in the output circuit 45 of the PB signal transmission circuit 29, first, the flag F1 is detected and the co-ordinate "05" is detected. Then, the co-ordinate "05" is converted to the PB signal having the frequencies "941-1366-770-1366" by referring to the table therein. Next, the flag F2 is detected and the co-ordinate "18" is detected. Then, the co-ordinate "18" is converted to the PB signal having the frequencies "697-1209-852-1366". After conversion, these frequencies are transmitted to the opposite game unit as the PB signals through the telephone line L.

What is claimed is:

1. A communication terminal, connected to a telephone line, for playing a game with an opponent through the telephone line, comprising:
    display means for displaying the game;
    touch panel provided on the display means to detect a co-ordinate to be displayed;
    touch signal detection means for generating a first portion signal to be transmitted to display means of a communication terminal of the opponent and corresponding to the co-ordinate;
    display board drive means for displaying the first position signal on the display means;
    PB signal transmission means for receiving and converting said first position signal into a first PB signal and transmitting the PB signal corresponding to said first position signal to the display means of the opponent through the telephone line;
    PB signal detection means for receiving a second PB signal from the opponent, and for converting the second PB signal from the opponent to a second position signal; and
    a push button type telephone connected in parallel to the communication terminal for transmitting a voice signal to the opponent, and a transformer, the communication terminal being connected in parallel to the communication line through said transformer so that the voice signal is simultaneously transmitted to the opponent with PB signals.

2. A communication terminal as claimed in claim 1, further comprising:
    storage means for temporarily storing the first position signal; and processor means for analyzing the first position signal and controlling a timing of transmission and reception of the PB signals.

3. A communication terminal as claimed in claim 1, wherein each position signal has a binary corresponding to the co-ordinate.

4. A communication terminal as claimed in claim 1, wherein the PB signal transmission means and the PB signal detection means each comprise a table for converting between the PB signal and the position signal.

5. A communication terminal as claimed in claim 1, wherein the PB signal transmission means and the PB signal detection means comprise a conversion circuit between a binary code and the decimal code.

6. A communication terminal as claimed in claim 1, further comprising a receiver for separating the voice, signal and the PB signal.

7. A communication terminal as claimed in claim 1, further comprising a driver for separating the voice signal and the PB signal.

* * * * *